US008639652B2

(12) United States Patent
Xu et al.

(10) Patent No.: US 8,639,652 B2
(45) Date of Patent: Jan. 28, 2014

(54) APPARATUS AND METHOD FOR CREATING PORTABLE ETL JOBS

(75) Inventors: Freda Xu, Cupertino, CA (US); Wu Cao, Redwood City, CA (US); Sridhar Ganti, Alameda, CA (US); Monfor Yee, San Francisco, CA (US); Chien Ming Yueh, San Jose, CA (US)

(73) Assignee: SAP France S.A., Paris (FR)

( * ) Notice: Subject to any disclaimer, the term of this patent is extended or adjusted under 35 U.S.C. 154(b) by 1497 days.

(21) Appl. No.: 11/303,047

(22) Filed: Dec. 14, 2005

(65) Prior Publication Data

US 2007/0136324 A1 Jun. 14, 2007

(51) Int. Cl.
G06F 7/00 (2006.01)
(52) U.S. Cl.
USPC .......................................... 707/602
(58) Field of Classification Search
USPC .......................................... 707/602
See application file for complete search history.

(56) References Cited

U.S. PATENT DOCUMENTS

| | | | |
|---|---|---|---|
| 6,356,901 B1* | 3/2002 | MacLeod et al. | 707/6 |
| 6,636,861 B1 | 10/2003 | Stack | |
| 7,139,779 B1* | 11/2006 | Kornelson et al. | 707/203 |
| 2004/0261060 A1* | 12/2004 | Haselden et al. | 717/120 |
| 2004/0268183 A1* | 12/2004 | Haselden et al. | 714/38 |
| 2005/0027721 A1 | 2/2005 | Saenz | |
| 2005/0228728 A1* | 10/2005 | Stromquist | 705/30 |
| 2005/0251533 A1 | 11/2005 | Harken et al. | |
| 2005/0262192 A1 | 11/2005 | Mamou et al. | |
| 2005/0278152 A1* | 12/2005 | Blaszczak | 703/1 |
| 2005/0289167 A1* | 12/2005 | Haselden et al. | 707/101 |
| 2006/0010419 A1* | 1/2006 | Haselden | 717/104 |
| 2006/0010423 A1* | 1/2006 | Haselden | 717/116 |
| 2006/0026585 A1* | 2/2006 | Haselden et al. | 717/168 |
| 2006/0053112 A1* | 3/2006 | Chitkara et al. | 707/9 |
| 2006/0059234 A1* | 3/2006 | Atchison et al. | 709/206 |
| 2006/0149706 A1* | 7/2006 | Prang et al. | 707/2 |
| 2006/0163338 A1* | 7/2006 | Allen et al. | 235/375 |

OTHER PUBLICATIONS

Hughes et al., SQL Server DTS, Aug. 2001, New Riders Publishing.*
Carlberg, Managing Data with Microsoft Excel, May 2004, Que Publishing.*
Policht, SQL Server 2000 DTS, Jan. 2004, Database Journal, Parts 1, 2, 3, 4, 6, 7.*
Malik, Pro ADO.NET 2.0, Sep. 19, 2005, APress.*
Otey, Microsoft SQL Server 2005 Developer's Guide, Oct. 31, 2005, McGraw-Hill Osborne Media, Chapter 8.*
PCT/US06/47679 ISR, Nov. 3, 2008, Business Objects, S.A.

* cited by examiner

Primary Examiner — Rehana Perveen
Assistant Examiner — Huen Wong
(74) Attorney, Agent, or Firm — Mintz Levin Cohn Ferris Glovsky and Popeo, P.C.

(57) ABSTRACT

A computer readable medium with executable instructions to receive a job and correlate a data store with each data source associated with the job. A first configuration profile is associated with the data store. A second configuration profile is specified for the data store. Dependent flows are identified. The dependent flow is updated to include additional configuration information derived from the second configuration profile.

7 Claims, 13 Drawing Sheets

| | Oracle1 | MsSql1 | MsSql2 |
|---|---|---|---|
| ⊟ Connection | | | |
| Default configuration | Yes | No | No |
| Database type | Oracle | Microsoft SQL Server | Microsoft SQL Server |
| Database version | Oracle 9i | Microsoft SQL Server 2000 | Microsoft SQL Server 7.0 |
| Database connection name | petery | N/A | N/A |
| Database server name | N/A | sj-pyueh1 | sj-pyueh1 |
| Database name | N/A | di11local3 | di11local |
| Use Windows authentication | N/A | No | Yes |
| User name | peterds | sa | |
| Password | ******** | | |
| ⊟ General | | | |
| Rows per commit | 1000 | 1000 | 1000 |
| Bulk loader directory | | N/A | N/A |
| Overflow file directory | | | |
| ⊟ Locale | | | |
| Language | <default> | <default> | <default> |
| Code page | <default> | <default> | <default> |
| ☐ Aliases (Click here to crea | | | |

Configurations for Datastore New_Datastore
Go to: Oracle1 (Default)
Datastore type: Database   CDC Enabled: No
Configurations: 3   LiveLoad: No

FIGURE 9

APPARATUS AND METHOD FOR CREATING PORTABLE ETL JOBS

BRIEF DESCRIPTION OF THE INVENTION

This invention relates generally to information processing. More particularly, this invention relates to creating portable Extract, Transform and Load (ETL) jobs that can be used in multiple data store configurations.

BACKGROUND OF THE INVENTION

The process of migrating data from a source (e.g., a database) to a target (e.g., another database, a data store, a data mart or a data warehouse) is sometimes referred to as Extract, Transform and Load, or the acronym ETL.

Existing ETL techniques focus on the creation of ETL jobs that are designed for a specific database configuration that is represented by the ETL repository as a single data store configuration. ETL jobs are special sets of instructions, or workflows, which define a unit of work that can be independently scheduled for execution. Defining workflows is an efficient way to maintain and reuse data extraction, transformation, and loading scripts, but this reuse has historically been limited to the context of a single data store configuration for each data source.

In some existing ETL systems, it is possible to provide simple modifications to profile information regarding a database logon ID/password, using aliases or other methods, but a systematic approach of providing detailed metadata regarding multiple data store profiles is not available. This limited approach to data store profile metadata means that when an ETL job is created, there is very limited flexibility in updating the job and its dependent data flows and workflows if there is a change in the data store configuration. For example, an upgrade from Oracle® 8 to Oracle® 9i requires that a computer programmer review all of the existing code associated with a job to make sure that it conforms to any modifications in SQL syntax and to confirm that it is updated to use new version information in all connection strings. This process is time consuming and prone to error if the developer fails to identify all of the potential dependencies between the job and various workflows and data flows.

Often within ETL systems it is desirable to create a job that can work in multiple environments. Consider the following cases in which ETL job portability is crucial: when working with multiple instances of a data source, when migrating between development/test/production environments, when an OEM partner designs jobs for one database type and deploys the jobs to other database types, and when working within multi-user development environments. In each of these cases there is a need to update an ETL job by changing the associated data store configuration. In the example of migration between development, test, and production environments, it is typical that each of the environments has its own versions of the data source (or set of data sources) and the target data source (or set of target data sources). Likewise, in a multi-user environment where developers and testers are working with different local or network accessible versions of source and target data sources, managing the creation and updating of an ETL job such that the job can easily be ported between these data sources is desirable. In these cases, job portability is desirable to accommodate modifications that are required to move an ETL job between different environments and versions of a data source.

It would be desirable to improve upon existing ETL techniques that configure a data store. In particular, it would be desirable to provide a mechanism for creating multiple configuration profiles for a data store and associating ETL jobs with the configuration profiles.

SUMMARY OF THE INVENTION

The invention includes a computer readable medium with executable instructions to receive a job and correlate a data store with each data source associated with the job. A first configuration profile is associated with the data store. A second configuration profile is specified for the data store. Dependent flows are identified. The dependent flow is updated to include additional configuration information derived from the second configuration profile.

BRIEF DESCRIPTION OF THE FIGURES

The invention is more fully appreciated in connection with the following detailed description taken in conjunction with the accompanying drawings, in which:

FIG. 9 illustrates a user interface that may be utilized in accordance with an embodiment of the invention.

Like reference numerals refer to corresponding parts throughout the several views of the drawings.

DETAILED DESCRIPTION OF THE INVENTION

Figure 1:
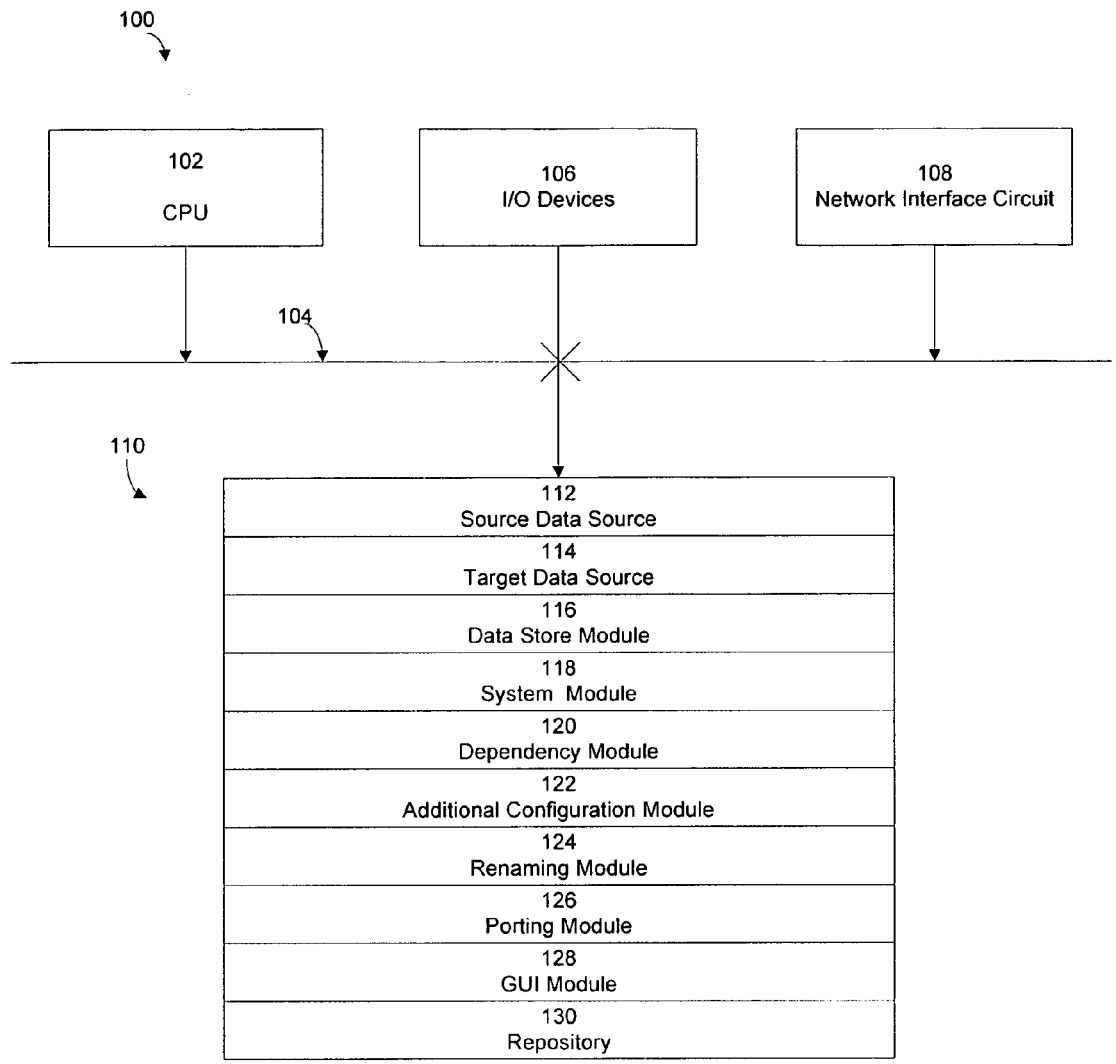
FIG. 1 illustrates a computer configured in accordance with an embodiment of the invention.

The following terminology is used while disclosing embodiments of the invention:

ETL is an acronym for extract, transform and load. ETL describes software tools that combine these functions to migrate data. For example, the migration may be from one database to another database or to a data mart or data warehouse. ETL is a specific data transformation process. Extracting refers to the process of reading the data from a source (e.g., a database). Transforming is the process of converting the extracted data from its previous form into the form it needs to be in and cleansing it so that it can be placed in the target (e.g., a new database, data mart, or data warehouse). Transformation may include rules or lookup tables or combining the data with other data. Loading is the process of writing the data into the target.

Data Transformation is used to describe the transforming process associated with ETL operations.

A Data Flow is a reusable object specifying the transformation of data from a source to a target. A data flow may be called from inside a workflow or job. Information may be passed into or out of a data flow using parameters.

An Embedded Data Flow is a data flow within one or more data flows.

A Workflow is a reusable object defining job execution. Workflows call data flows, but do not manipulate data. Workflows are called from inside other workflows or jobs. Information is passed into or out of workflows using parameters. In one embodiment, workflows are reused by dragging existing workflows from an object library.

Flow is the general term that encompasses a job, workflow, or data flow object.

A Dependent Flow is a job, workflow, or data flow where a database object is used.

A Job is a unit of work. A job can be scheduled independently for execution by an administrator. Jobs are special workflows that can be scheduled for execution, but cannot be called by other workflows or jobs.

A Data Source is a database, file, data mart, or data warehouse that may be associated with ETL processing. A data source from which data is extracted or copied is a source data source and a data source in which data is loaded is a target data source. A data store is used to define each source and target data source associated with an ETL job.

A Data Store is a repository of information about a data source (e.g., a source data source or a target data source). Within an ETL system, a data store may be defined for each source and target. The data store may provide a logical connection to a source or target. Data stores may be configured to import metadata (e.g., table names, column names, column data type, primary key columns, and table attributes) for the source and target, to read data from the source, and to load data into the target. Through multiple sets of data store configurations, a single data store can be mapped to multiple databases and instances of those databases. The data store may be used to describe an adapter that is used to exchange data between a data source and a dataset.

A Data Store Configuration Profile characterizes a data source. Multiple data store configuration profiles may be associated with a single data source. These profiles may specify information including database type, database connection name, user name, password, database version, locale information, and design name aliases for database object owners. The data store configuration profile may be used to describe an adapter data store.

Default data store configuration is a specified data store configuration. If a data store has only one configuration, that configuration is the default data store configuration. If a data store has multiple configurations, the user selects one configuration as the default data store configuration.

Current data store configuration is the data store configuration that is to be used in executing the next job. The user can define a system configuration which specifies a configuration for each data store that is to be used for executing a job. The user can then execute the job using the system configuration. If no system configuration is present when the job is executed or the system configuration does not specify the configuration for a data store in the job, the default data store configuration is used when the job is executed.

Database object refers to information and functions imported from a data store. Database objects typically have owners, but this depends on the data source. For example, objects in an ODBC data store connecting to an Access database do not have owners.

Real owner name also referred to as database owner name or physical owner name is the owner name for database objects in underlying databases.

Design owner name is the name defined in a set of logical owner names that is related to a user's business logic or process. These names are transparent across database environments. Design owner names may or may not be the same as the real owner names.

Metadata is information about information. Metadata typically constitutes a subset or representative values of a larger data set. In the present invention, metadata is typically in the form of data store configuration profiles and associated variables. Metadata associated with the invention provides configuration information that is applied to make ETL jobs portable between source data when the differences include such things as database type, version, connection and logon profiles, and database locations. There is a second level of metadata about the source and target databases that may be imported into the repository to provide information about the source data such as table names, column names, column data type, primary key columns, and table attributes.

A Multi-user Environment is a system supporting multiple users, commonly to access multiple repositories and data sources.

Data Integrator Designer (DI) is a GUI development environment to define data application logic to extract, transform, and load data from databases and applications into a data warehouse used for analytical and on-demand queries. In one embodiment, a graphical user interface (GUI) tool enables a user to create and edit data stores, create ETL jobs, and associate ETL jobs with data stores and specific data store configuration profiles. Data store creation, configuration, and the association of data stores and specific data store configurations with ETL jobs is only one feature of the Data Integrator Designer.

FIG. 1 illustrates a computer 100 configured in accordance with an embodiment of the invention. The computer 100 has standard components including a central processing unit 102, a bus 104, input/output devices 106, and a network interface circuit 108. The input/output devices 106 may include a keyboard, mouse, display, printer, and the like. The network interface circuit 108 facilitates communications with networked computers (not shown). The computer 100 also includes a memory 110. The memory 110 includes executable instructions to implement operations of the invention.

In the example of FIG. 1, the memory 110 includes a source data source 112 and a target data source 114. These source data sources and target data sources may be a database, file, data mart, or data warehouse. Naturally, the memory may include multiple source databases 112 and/or target databases 114. In addition, the source and target databases may be on different machines in a networked environment. The configuration of FIG. 1 is simplified for illustrative purposes.

The memory 110 also includes a data store module 116. The data store module 116 includes executable instructions to implement data store creation and the creation of multiple data store configuration profiles in accordance with embodiments of the invention. The data store module 116 creates data stores to represent a source data source 112 or a target data source 114 that is associated with an ETL job. One or more data source configuration profiles may be associated with a single data store.

The memory 110 also includes a system module 118. The system module 118 includes executable instructions to specify a source data store configuration and target data store configuration that will be used when a job is executed. In one embodiment of the invention, if a system data store configuration is defined, it takes precedence over the default data store configuration specified for a data store.

The data store configuration profiles are stored as objects that are referenced by the data flows. For example, the following data store configuration sample code illustrates the configuration for two source data stores:

```
"ds_configuration_enabled" = 'yes',
<DSConfigurations>
<DSConfiguration default="true" name="DB2_config">
"database_type" = 'DB2',
<DB2_version>DB2 UDB 8.x</DB2_version>
"db_alias_name1" = 'DBUSER',
"db_alias_user1" = 'DB2ADMIN',
<loader_xact_size>1000</loader_xact_size>
<locale_codepage>default</locale_codepage>
<locale_language>default</locale_language>
<locale_territory>default</locale_territory>
<odbc_data_source>ODBC_SourceName</odbc_data_source>
<password>passwordValue1</password>
<user>db2admin</user>
</DSConfiguration>
<DSConfiguration default="false" name="sybase_config">
<database_type>Sybase</database_type>
<sybase_version>Sybase ASE 12.x</sybase_version>
<db_alias_name1>DBUSER</db_alias_name1>
<db_alias_user1>DBO</db_alias_user1>
<loader_xact_size>1000</loader_xact_size>
<locale_codepage>default</locale_codepage>
<locale_language>default</locale_language>
<locale_territory>default</locale_territory>
<sql_server_database>NameForSQL_DB</sql_server_database>
<sql_server_dataserver>NameForSQL_Dataserver</sql_server_dataserver>
<user>sa</user>
</DSConfiguration>
</DSConfigurations>
```

In the sample above, the "DB2_config" profile is the default profile. Depending on the system settings, and the priority given for default versus system level settings, this would be the default configuration applied to the ETL job for the source data store.

The sample flow code specifies a number of configuration values for the data store. Each data store configuration is indicated by the <DSConfiguration></DSConfiguration> tags and the group of configurations are within the <DSConfigurations></DSConfigurations> tags. That data store configuration is enabled as indicated in the phrase: "ds_configuration_enabled"='yes'. Within the sample code, each configuration profile includes the following information: whether the configuration is the default configuration (true/false), the configuration name (in this case DB2_config/sybase_config), the database type (DB2/Sybase), database version (DB2 UDB 8.x/Sybase ASE 12.x), alias names associated with the profiles (db_alias_name1/db_alias_user1) and the database owner names to which they map. Further code indicates a basic loader setting, locale settings, and connection information specific to the data source. The sample code is provided for the purposes of illustration and is not indicative of the code output content or format which may differ based on implementation.

This profile property code is added to the code that represents the data store so that both sets of properties can be referenced by a flow. In this way, a change of default configuration profile from the current default DB2_config to sybase_config, only requires an update to the property that indicates which profile is the default profile.

A dependency module 120 is also stored in memory 110. The dependency module 120 includes executable instructions to identify dependent workflows and data flows for a specific data store. The dependent flow may be called from within the ETL job.

Memory 110 also stores an additional configuration module 122. The additional configuration module includes executable instructions to supply additional configuration that is based on database type and version rather than data store configuration profiles. This additional configuration is applicable to data flows where values need to be specified based on the database type and version rather than based on specific configuration values. Often, in order to optimally work with a database there is configuration related to readers/loaders/and SQL transforms where based on the database various methods or property settings are optimal. In the case of SQL transforms, there are options where databases support different SQL syntax for queries, lookups, etc, to be optimized for the specific database. The additional configuration information may be used to support additional data sources, scripts, lookup function, and logic statements.

In addition to the data store module 116 adding configuration details to the data store, when the change between the first and second configuration profile involves a change to the type or version level, the porting module 126 adds additional code to specify, reader, loader, SQL transform and other custom behavior. Likewise, scripts and functions based on data store configurations are updated to reflect the values associated with the second data store configuration. Depending on the changes between the first configuration for the data store and the second configuration in the data store module 116, in addition to having available the second set of configuration values in the data store object, the porting module 126 also updates the relevant code within the dataflow.

A renaming module 124 is also stored in memory 110. The database object owner renaming module includes executable instructions to apply a generic alias to database object owner identities in ETL jobs and dependent data flows and workflows including updating a mapping that links specific owner names with generic aliases. For example, the renaming module 124 renames tables and functions used in different dependent objects (for example jobs, workflows, data flows, and user script functions). In data flows, the table or function may be used in column mappings, where clauses, nested schema's column mappings, and new function calls (for example external lookup and stored procedures). After renaming, the new owner name appears in the occurrences of the table/function being renamed.

Memory 110 also stores a porting module 126. This module contains executable instructions to support porting between different database versions and types by either accepting or providing values related to the migration from one database type and version to another. The porting module 126 modifies the language of those data flows that contain the table targets and SQL transforms from the data store to add the target options and SQL transform text for the new database type/version based on the target options and SQL transform text that the user has defined for an existing database type/version. In one implementation, the porting module 126 can be invoked when the user creates a new data store configuration. When the new data store configuration profile has the same database type and version as the existing data store configuration profile, the porting utility will not be invoked. This is because the targets and SQL transforms already have the properties set for that database type and version. When the new configuration has the same database type but higher database version than the old configuration, the porting module 126 will copy properties of the objects (e.g., loaders and SQL transforms) from the old configuration to the new configuration. In other words, if a target T1 has the auto-correct option set to TRUE for the old configuration's database type/version, the same target T1 will have the auto-correct option set to TRUE for the new configuration's database type/version. In the case that the new configuration has the same database type but lower database version than the old configuration, or the new configuration has the different database type, the porting utility will copy all the properties except the bulk loader properties from the old configuration to the new configuration. In one embodiment of the invention, if a target T1 has the bulk loader option set to API for the old configuration's database type/version (for example the old configuration's database type/version is Oracle® 9i), the same target T1 will have the bulk loader option set to FALSE for the new configuration's database type/version (for example the new configuration's database type/version is Oracle® 8i or MSSQL® 2000). In this embodiment, if the user wants the Oracle® 8i or MSSQL® 2000 target to use the bulk loader too, this preference will need to be manually set. In one implementation, the user is also given an option to use a generic default set of additional configuration values.

In the following example, flow code is added to set properties for the load based on the database version and type specified in the data store configuration profile. The load properties and values supported by different data sources differs and therefore in addition to the general profile configuration information added to the flow, specific properties and syntax is needed for different database types and versions supported by data store configuration profiles.

```
LOAD TABLE target_ds.DBUSER.EMP_TARGET INPUT ( EMP) SET (
"connection_port" = 'no',
"ldr_configuration_enabled" = 'yes',
<LDRConfigurations>
<LDRConfiguration database_type="Sybase" database_version="Sybase ASE 12.x">
<bulk_ldr_all_rows></bulk_ldr_all_rows>
<bulk_ldr_max_errors></bulk_ldr_max_errors>
<bulk_ldr_rows_per_commit>1000</bulk_ldr_rows_per_commit>
<enable_partitioning>no</enable_partitioning>
<ignore_column_case>yes</ignore_column_case>
<ignore_columns_null>no</ignore_columns_null>
<ignore_columns_value></ignore_columns_value>
<loader_auto_correct>no</loader_auto_correct>
<loader_bulk_load></loader_bulk_load>
<loader_compare_column>compare_by_name</loader_compare_column>
<loader_delete_map></loader_delete_map>
<loader_drop_and_create_table>yes</loader_drop_and_create_table>
<loader_insert_map></loader_insert_map>
<loader_load_choice>append</loader_load_choice>
<loader_num_parallel_loaders>1</loader_num_parallel_loaders>
<loader_overflow_file>overflow_file</loader_overflow_file>
<loader_post_load1></loader_post_load1>
<loader_pre_load 1></loader_pre_load1>
<loader_quote_names>0</loader_quote_names>
<loader_transactional>no</loader_transactional>
<loader_transactional_order>0</loader_transactional_order>
<loader_update_key_columns>no</loader_update_key_columns>
<loader_update_map></loader_update_map>
<loader_use_user_defined_keys>no</loader_use_user_defined_keys>
<loader_xact_size>1000</loader_xact_size>
<overflow_file_format>write_data</overflow_file_format>
<use_overflow_file>no</use_overflow_file>
<mssql_bulk_ldr_mode>append</mssql_bulk_ldr_mode>
<mssql_bulk_ldr_packet_size>0</mssql_bulk_ldr_packet_size>
</LDRConfiguration>
<LDRConfiguration database_type="DB2" database_version="DB2 UDB 8 .x">
<bulk_col_delimiter>/127</bulk_col_delimiter>
<bulk_ldr_cleanup>yes</bulk_ldr_cleanup>
<bulk_ldr_generate_files_only></bulk_ldr_generate_files_only>
<bulk_ldr_max_discards>10</bulk_ldr_max_discards>
<bulk_ldr_recoverable></bulk_ldr_recoverable>
<bulk_ldr_rows_per_commit>1000</bulk_ldr_rows_per_commit>
<column_delimiter>,</column_delimiter>
<enable_partitioning>no</enable_partitioning>
<ignore_column case>yes</ignore_column_case>
<ignore_columns_null>no</ignore_columns_null>
<ignore_columns_value></ignore_columns_value>
<loader_auto_correct>no</loader_auto_correct>
<loader_bulk_load></loader_bulk_load>
<loader_compare_column>compare_by_name</loader_compare_column>
<loader_delete_map></loader_delete_map>
<loader_drop_and_create_table>yes</loader_drop and_create_table>
<loader_insert_map></loader_insert_map>
<loader_load_choice>append</loader_load_choice>
<loader_num_parallel_loaders>1</loader_num_parallel_loaders>
<loader_overflow_file>overflow_file</loader_overflow_file>
<loader_post_load1 ></loader_post_load1>
<loader_pre_load1 ></loader_pre_load1>
```

```
<loader_quote_names>0</loader_quote_names>
<loader_transactional>no</loader_transactional>
<loader_transactional_order>0</loader_transactional_order>
<loader_update_key_columns>no</loader_update_key_columns>
<loader_update_map></loader_update_map>
<loader_use_user_defined_keys>no</loader_use_user_defined_keys>
<loader_xact_size>1000</loader_xact_size>
<overflow_file_format>write_data</overflow_file_format>
<text_delimiter></text_delimiter>
<use_overflow_file>no</use_overflow_file>
<db2_bulk_ldr_copy_target_dir></db2_bulk_ldr_copy_target_dir>
<db2_bulk_ldr_datafile_onclient>no</db2_bulk_ldr_datafile_onclient>
<db2_bulk_ldr_exception_table></db2_bulk_ldr_exception_table>
<db2_bulk_ldr_mode>insert</db2_bulk_ldr_mode>
<db2_bulk_ldr_type>import</db2_bulk_ldr_type>
</LDRConfiguration>
</LDRConfigurations>',
"loader_template_table" = 'yes',
"name"='target_ds');
```

Based on the configuration applied, the load job uses the appropriate configuration values. In the illustrative sample code above, the load data flow loads a target ds.DBUSER.EMP with input from a flow called EMP. It is specified that the loader configuration is enabled ("ldr_configuration_enabled"='yes') and then between the <LDRConfigurations></LDRConfigurations> tags the configuration profiles are specified. Each individual set of loader configurations is defined between the <LDRConfiguration></LDRConfiguration> tags. In the sample code, loader configuration is provided for both Sybase ASE 12.x and DB2 UDB 8.x. Different loading code can be specified for each database type and version. This is different than the case of data store configuration profiles, where a profile may describe different configurations where the database type and version are the same (but the data source has different properties such as connection values/passwords/locales etc). In the case of a porting configuration, this is specified for each database type/version combination and will be applied to all data store configuration profiles, where the database type and version match the one specified in the additional loading configuration or other relevant additional configuration profile.

Different database types and versions accept different properties. As seen in the sample code above, many of the properties are set for both data sources, but other properties are specific to the database type and version being configured. The sample code is provided for the purposes of illustration and is not indicative of the code output content or format which may differ based on implementation.

The porting module 126 handles the addition of code that is required to support different database types or versions specified in a second configuration profile. The data store module 116 makes the alternate configuration available in the data flow, but it is the porting module 126 that handles setting the values for loaders, readers, transforms, etc. that are implied by the change from the first to the second configuration profile.

In one implementation, the porting module 126 provides a log after modifying the flows that includes the following information: the names of the flows, which language is modified, the objects in the data flows that are affected, the type of the objects (table target or SQL transform), the usage of the objects (source or target), whether the objects have a bulk loader, and whether the bulk loader option is copied. The user may want to customize the properties of some targets or SQL transform after running the porting module, but the porting utility completes the core porting tasks.

A GUI module 128 is stored in memory 110. The GUI module 128 includes executable instructions to display interfaces, such as shown in FIGS. 8-11 and to receive input from such interfaces, which are discussed below.

Memory 110 also stores a repository 130 that is used to store objects such as data stores, data store configuration profiles, jobs, workflows and data flows. In one embodiment of the invention, a flow is updated to include additional configuration values and code to support the additional configuration values and is automatically saved in the repository. Flows within the repository can be exported for use in other ETL system instances.

Figure 2:
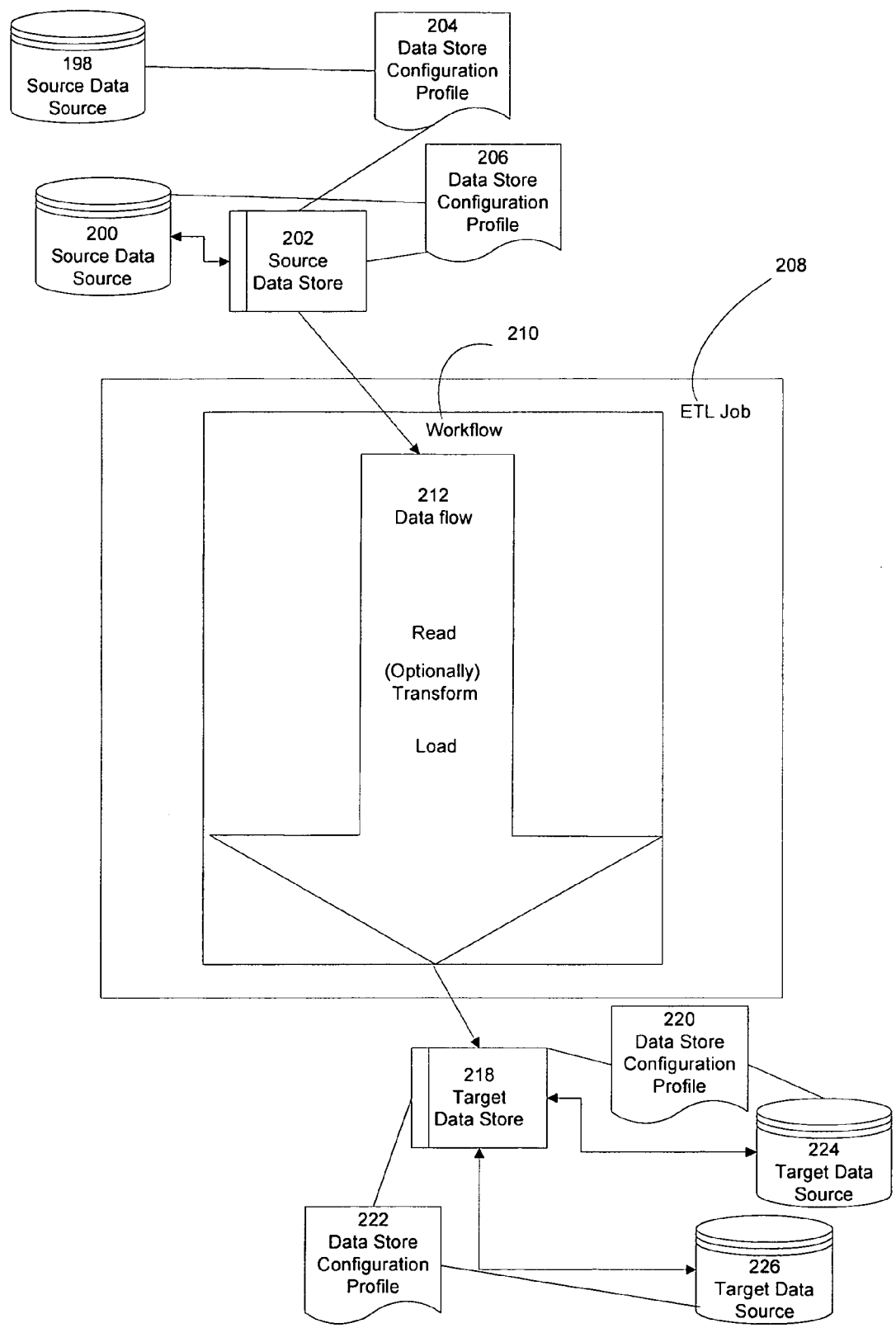
FIG. 2 illustrates general processing operations associated with an embodiment of the invention.

FIG. 2 illustrates processing operations associated with an embodiment of the invention. FIG. 2 shows a simplified configuration for illustrative purposes. FIG. 2 depicts an embodiment of the invention in which two source data sources 198, 200 and two target data sources 224, 226 are defined by data stores 202 and 218, respectively. The data stores are characterized by configuration profiles 204, 202, 220, 222. Any number of data store configurations can be associated with a data store and any number of data stores can be associated with a flow. In FIG. 2, data sources 198 and 200 are associated with the data store 202. Based on the values specified in the data store configuration profile (e.g., for database type, connection, version, and locale) any number of different data sources can be associated with a data store. These source and target data sources are associated with a simple ETL job 208. For the purposes of illustration, FIG. 2 depicts a single workflow 210 that contains a single data flow that reads, optionally transforms, and loads data. An ETL job can contain numerous workflows with each workflow potentially containing any number of data flows.

The ETL job 208 contains a workflow 210 that contains a data flow 212 that is associated with the source data store 202 and one of the data store configuration profiles 204, 206. The optional transform operates on the data supplied by the reader and passes the data that has been transformed to be loaded into a target data source. The loader is associated with a target data store 218 that defines the potential target data sources for the ETL job. In this case the data store 218 has two configuration profiles 220, 222 and each configuration profile describes a configuration for a different data source. Data store configuration profile 220 describes a configuration for data source 224 and data store configuration profile 222 describes a configuration for data source 226. The configuration profile that will be applied to each data store is specified at either the system module 118 level, or by setting the default property associated with the data store configuration profile.

In FIG. 2, if the ETL job 208 initially used a first source data store configuration profile 204, the user could then identify a second data store configuration profile 206 that would be used to define the data base objects that were accessed by the ETL job. A dependency module 120 identifies the flows that are affected by the change in configuration profile. A data store module 116 makes available to the existing flow the configuration information to accommodate and support the second set of configuration values. Depending on the changes between the configuration profiles, the data store module 116 operates in conjunction with the renaming module 124 and the porting module 126. Based on the update between the first configuration and the second configuration, the changes may include adding the profile information, and potentially adapting scripts, functions, loaders, readers, and transforms to reflect values associated with the second data store configuration 206. In one embodiment, the new version of the data flow is saved to a repository for future use and potential export.

Figure 3:
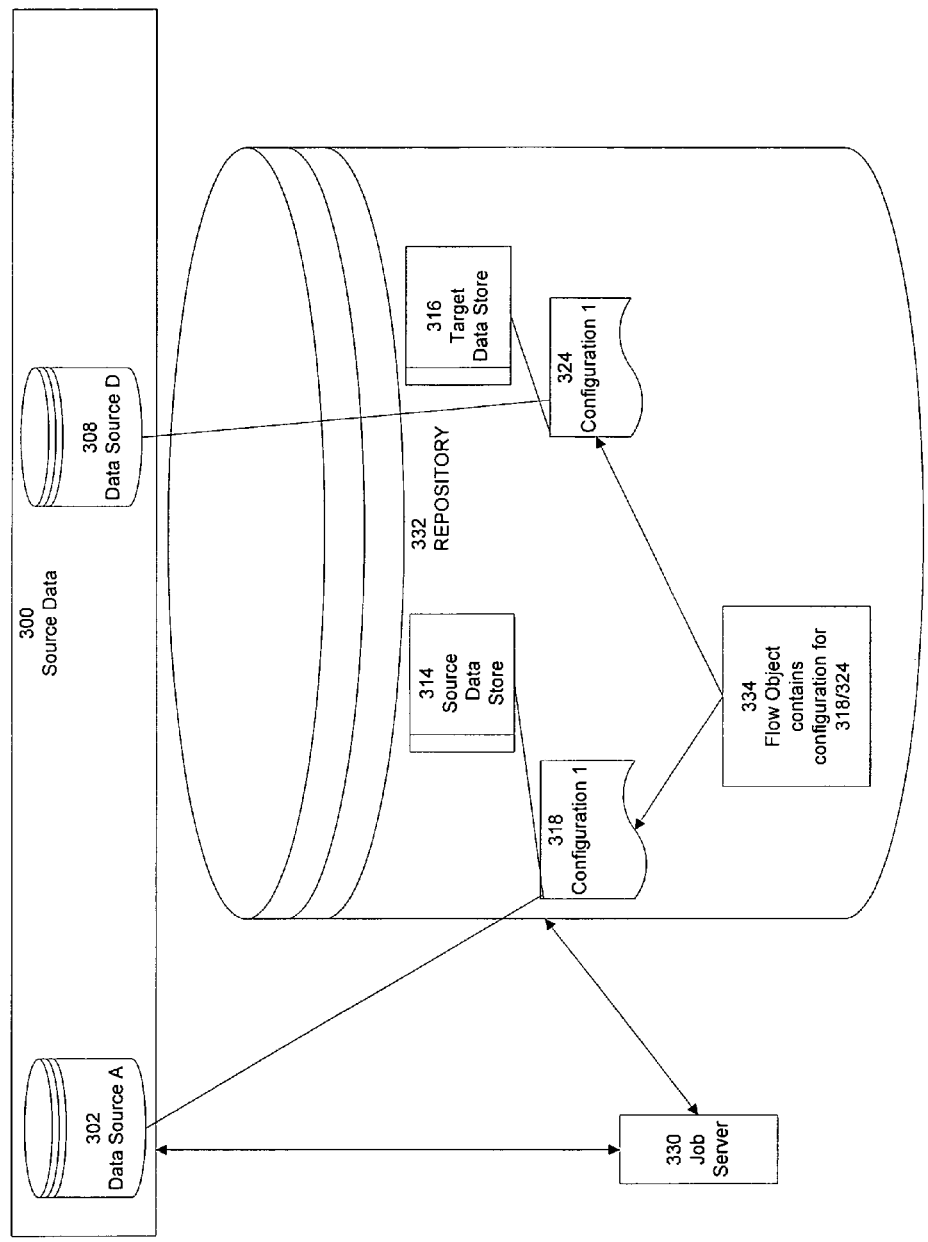
FIG. 3 illustrates processing operations associated with an embodiment of the invention.
Figure 4:
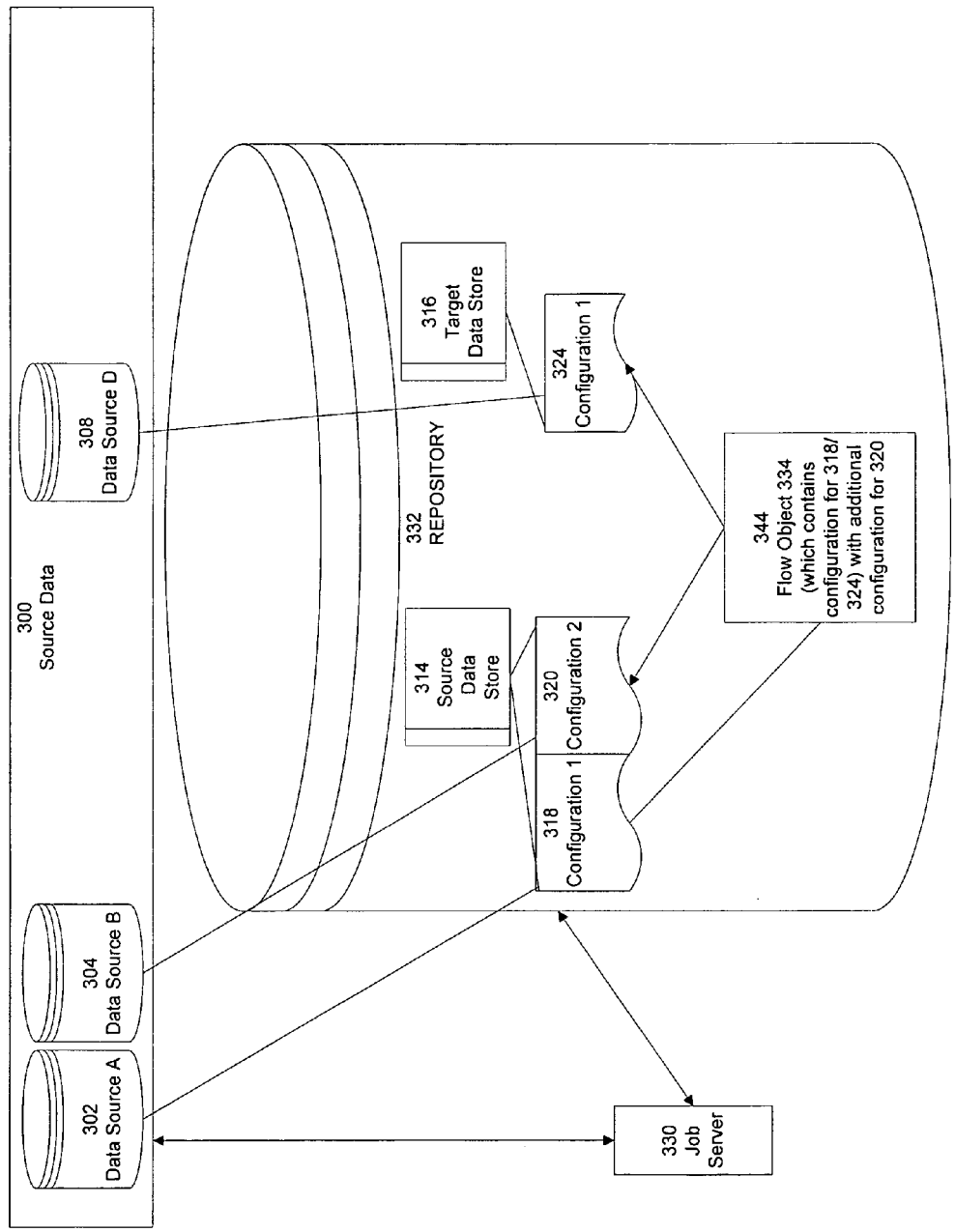
FIG. 4 elaborates on FIG. 3 to illustrate processing operations associated with an embodiment of the invention.
Figure 5:
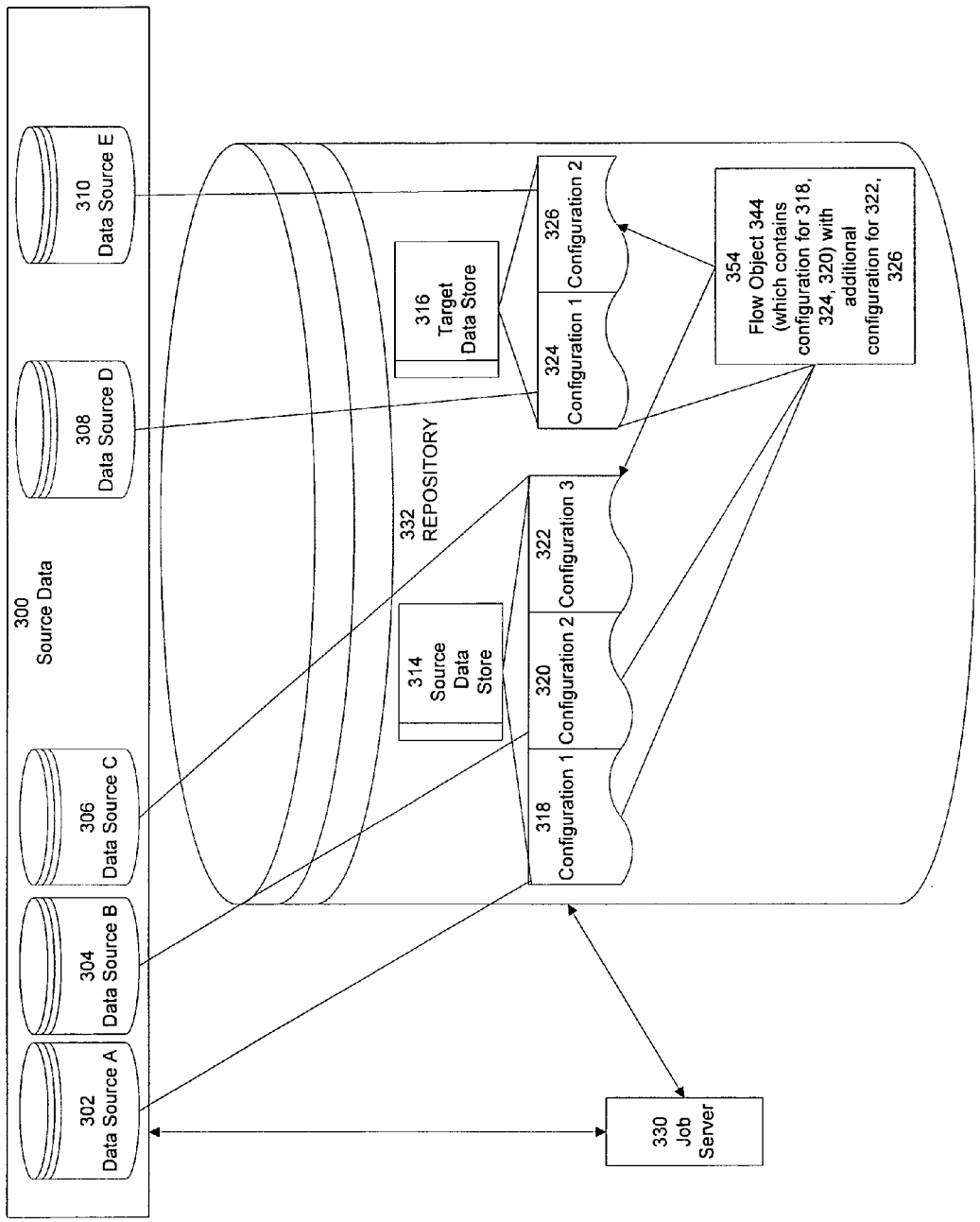
FIG. 5 elaborates on FIGS. 3 and 4 to illustrate processing operations associated with an embodiment of the invention.

FIG. 3 illustrates processing operations associated with an embodiment of the invention. FIG. 3, in conjunction with FIGS. 4 and 5, shows the addition of configuration information to a flow object within a repository as new configuration profiles are associated with the data flow. Data flow objects are the type most commonly updated based on additional data store configuration profiles, however, in one embodiment of the invention, job and workflow objects are also updated with additional configuration information to reflect additional data store configuration profiles.

In FIG. 3, the repository 332 contains a flow object 334 that is associated with a source data store 314 and a target data store 316 that references a first configuration 318 for the source data store and a first configuration 324 for the target data store. The source data store 314 in conjunction with configuration profile 318 describes a data source 302. Likewise, the target data store 316 in conjunction with configuration profile 324 describes a data source 308. Typically, as this embodiment depicts, a flow object is created to work with a specific source and target data source. However, it is often desirable to port the flow so that it works with a different source or target data source.

FIG. 4 depicts the addition of a second configuration profile 320 associated with the source data store 314. For example, if the flow 334 was written based on source data in one Oracle database and because of maintenance a new instance of that data source was created, this new configuration profile 320 could be used to describe that new instance including any changes to the database name or connection information. Likewise, if the original data source 302 version level was changed (for example from version 8 to version 9i of Oracle), the new configuration profile 320 could be used to describe the upgraded database. Similarly, if the ETL developer created a copy of the original data source on his computer, the new configuration 320 could be used to describe this new data source. Likewise, if an OEM ETL developer created an ETL job for one data source but wanted to implement it for a different data source at the customer site, this second configuration 320 could be used to describe a different type of data source 304.

The original flow object 334 only references the configuration values to support two configuration profiles 318 and 324. Within the flow object 334, the configuration values associated with the configuration profiles 318 and 324 will be applied when the flow is run. Any code to support readers/loaders/SQL transforms etc. will be based on these data source configuration profiles' database types and versions.

The second flow object 344 is an updated version of flow object 334 that is created when an additional configuration profile 320 is added to the source data store 314. In this case, any configuration values in flow object 344 for readers/loaders/SQL transforms etc. will be augmented with properties to support configuration profile 320 if configuration profile 320 describes either a different database type or a different database version than configuration profile 318. Likewise, if different aliases are specified in the data store configuration profile, the flow will be updated to contain the additional alias values. The reader/loader/SQL transform code that will be applied depends on the configuration profile that is set as the default profile either at the system level or based on a default property within the data store configuration profile. In the case where configuration profile 320 is specified as the default configuration profile, the reader/loader/SQL transform etc code related to the database type and version described in configuration profile 320 will be applied when the flow is run. The reader/loader/SQL transform code to support other database types and versions is maintained in the flow object and will be applied when a configuration profile that matches that database type and version is specified when the flow is run.

If this second configuration 320 for the source data store 314 is associated with the first flow object in the repository 334, this will trigger the dependency module 120 to identify the dependent flows. For the purposes of illustration, a single flow object is depicted in FIGS. 3-5, naturally, in a typical implementation there may be many dependent flows and these dependent flows are identified by the dependency module and updated with the additional configuration values. The data store module 116 adds configuration information that can be referenced by the original flow and its dependent flows to support the second configuration profile 320. Depending on the change in configuration indicated by the second configuration profile 320 the renaming module 124 and the porting module 128 may also be invoked. In the case where there is a difference in version level or type between the databases described in the configuration profiles, the porting module 126 will augment the dependent properties of the objects (readers, loaders, SQL transforms, etc.) from the old configuration with the new configuration. During this process, flow object 334 that originally included configuration related to data store profiles 318 and 324 is updated to include configuration for data store profile 320 that describes a data source 304.

FIG. 5 illustrates the addition of a third configuration profile 322 to the source data store 314 and a second configuration profile 326 to the target data store 316. In this case, flow object 344 updates as flow object 354 and this new flow object contains the cumulative configuration for readers/loaders/SQL transforms etc. from 334, 344, and the additional configuration profiles 322 and 326 that have been added. For example, if each of these configuration profiles 318, 320, 322, 324, 326 described a different database or different database version, flow 354 would contain three sets of reader values and two sets of loader values. Depending on the configuration profile that is specified when the flow is run, the appropriate reader/loader/SQL transform etc. code is applied that matches the database type and version described in the configuration profile. As configuration profiles are added to the repository 322, the dependent flow objects are updated to contain reader/loader/SQL transform, etc. code that supports the added data store configuration profiles.

Depending on the nature of the changes in the second configuration profile, the renaming module 124 and porting module 126 are invoked to add the additional metadata to flow object 354. The updated flow object 354 contains the configuration to handle configurations profiles 318, 320, 322, 324, 326, and therefore to access/write to data sources 302, 304, 306, 308, 310. Depending on the default configuration profile specified using the system module or the default property within the data store configuration profile, the updated flow object 354 is able to access/write to data sources 302, 304, 306, 308, and 310 without any additional code being added or need to change the flow object 354.

In FIGS. 3-5, the flow objects 344 and 354 are illustrated as including additional configuration based on the porting module 126 updating the flow based on modifications required to support the added data store configuration profiles. This update would only occur for flow 344, if the configuration profile 320 added to 344 described either a different database type or different database version than configuration profile 318 that was associated with flow 334. In the situation that both configuration profiles described the same database type and version, the flow would reference the appropriate data store configuration, but the flow itself would not be updated. Likewise, in the case of flow 354, the updates would require a change in database type or version between the source configuration profiles 320 and 322 or a change in database type or version between configurations 324 and 326 for the porting module to update the flow.

Figure 6:
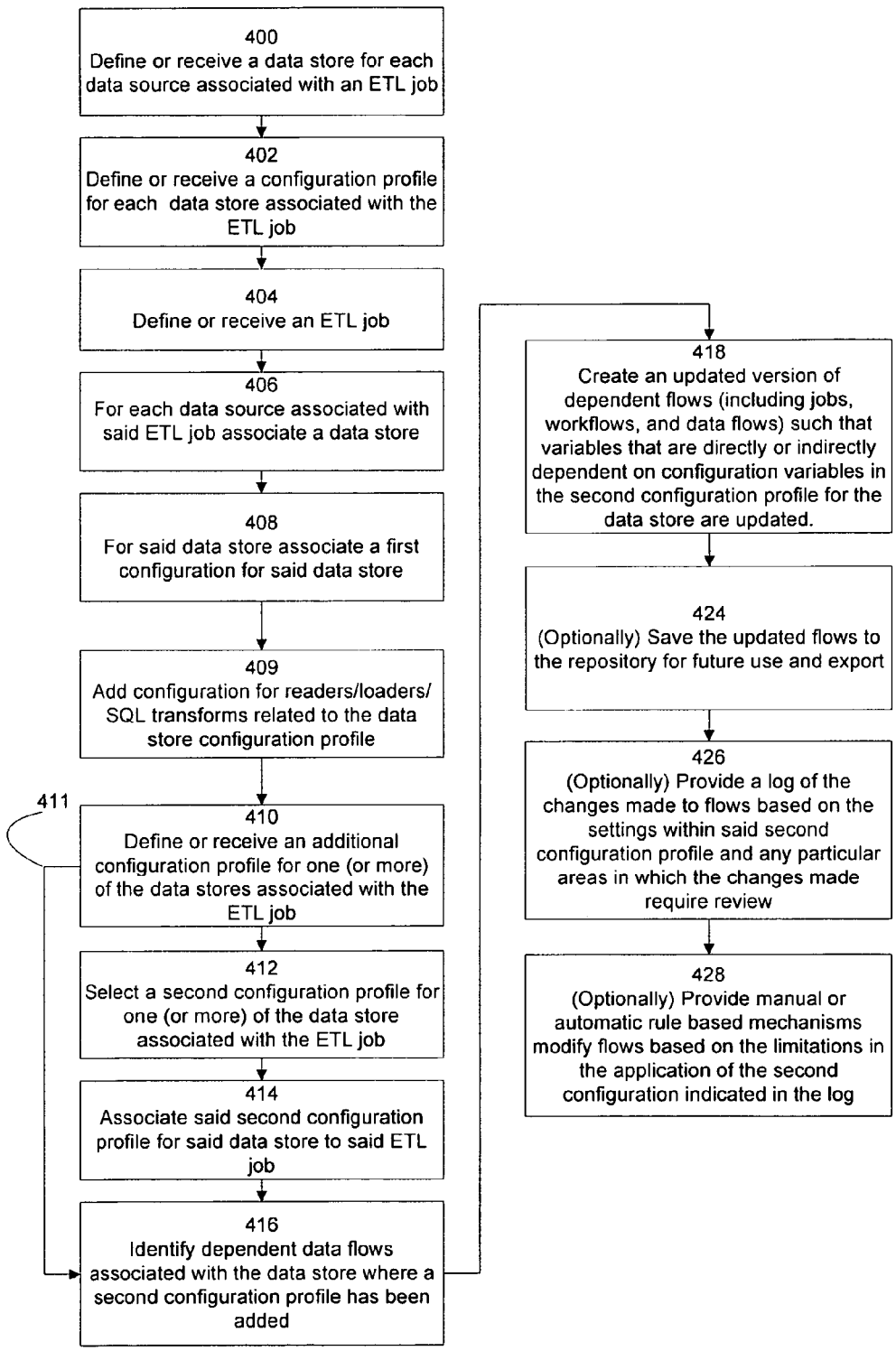
FIG. 6 illustrates processing operations associated with an embodiment of the invention.

FIG. 6 illustrates general processing operations associated with a basic workflow of one embodiment of the invention. The process begins with defining a data store for each data source associated with an ETL job 400. In one embodiment of the invention, the data store definition is received through an automated process. Receiving an ETL job implies either defining the job or receiving the job.

Before creating an ETL job, the data to be associated with the ETL job is typically identified. A configuration profile is then defined or received for each data store associated with the ETL job 402. When a data store is first created, the initial description of the data store is typically understood to be a first configuration profile. This configuration provides specific information about a first data source associated with the data store. The ETL job is then received or defined 404. A data store is then associated with each data source associated with the ETL job 406. For each data store, there is a configuration specified 408. This configuration is specified using the data store module 116, but preferences concerning which configuration profile should be used by default can be specified using the system module 118 or by setting the configuration as a default configuration in the data store module 116.

Within a data flow, additional configuration may be specified based on database version and type 409. This configuration relates to specific properties applied by loaders, readers, and SQL transforms. This configuration is used to specify properties that are specific to a database type and version, or SQL syntax that is optimized for a specific database type and version. If a data store configuration profile is added that contains the same database type and version as existing additional configuration, this existing additional configuration for the database type and version is applied. Default values are provided for this additional configuration and are applied if values are not specified for this additional configuration. In one implementation, this configuration is specified using a graphical user interface when designing the ETL job. This additional configuration is specified using the additional configuration module 122.

For various reasons it often becomes desirable to port an ETL job in order for it to work with a different source or target data source. When it becomes desirable to associate a different data source, or different settings for a data source, with a data store a second configuration profile is defined or received for one or more of the data stores associated with the ETL job 410. In one embodiment of the invention, the second configuration is automatically added to all dependent flows associated with the data store 411. In another embodiment of the invention, the dependent flows are only updated when the second data store configuration is associated with a job. In this embodiment, the second configuration is then selected 412 and associated with the ETL job 414 either using the data store module 116 to set the second configuration as the default configuration or using the system module 118 to associate default source and target data store configurations with the job. Dependent flows (typically data flows, but in one embodiment of the invention also work flows and jobs) that use data source objects are identified 416 by a dependency module 120. An updated version of the dependent flows (including jobs and workflows depending on the embodiment) is created such that the original configuration is maintained and additional configuration information and code is added such that variables that are directly or indirectly dependent on configuration variables in the second configuration profile for the data store are updated 418.

Optionally, although typically, the updated dependent flows are saved to the repository as objects for future use and export 424. The updated dependent flows contain the configuration information that was originally in the flow and the additional configuration information that was added to accommodate the second configuration profile for the data store.

In one embodiment, the invention includes additional logging in order to track changes made when updating the dependent flow objects 426. This optional log specifies the changes made to the flow objects which may flag areas where such changes require review 426. Based on this logging 426, optionally further rules processing can occur 428. Optionally, a manual or automatic rule based mechanism modifies the flow objects based on the limitation indicated in the log 428.

Figure 7:
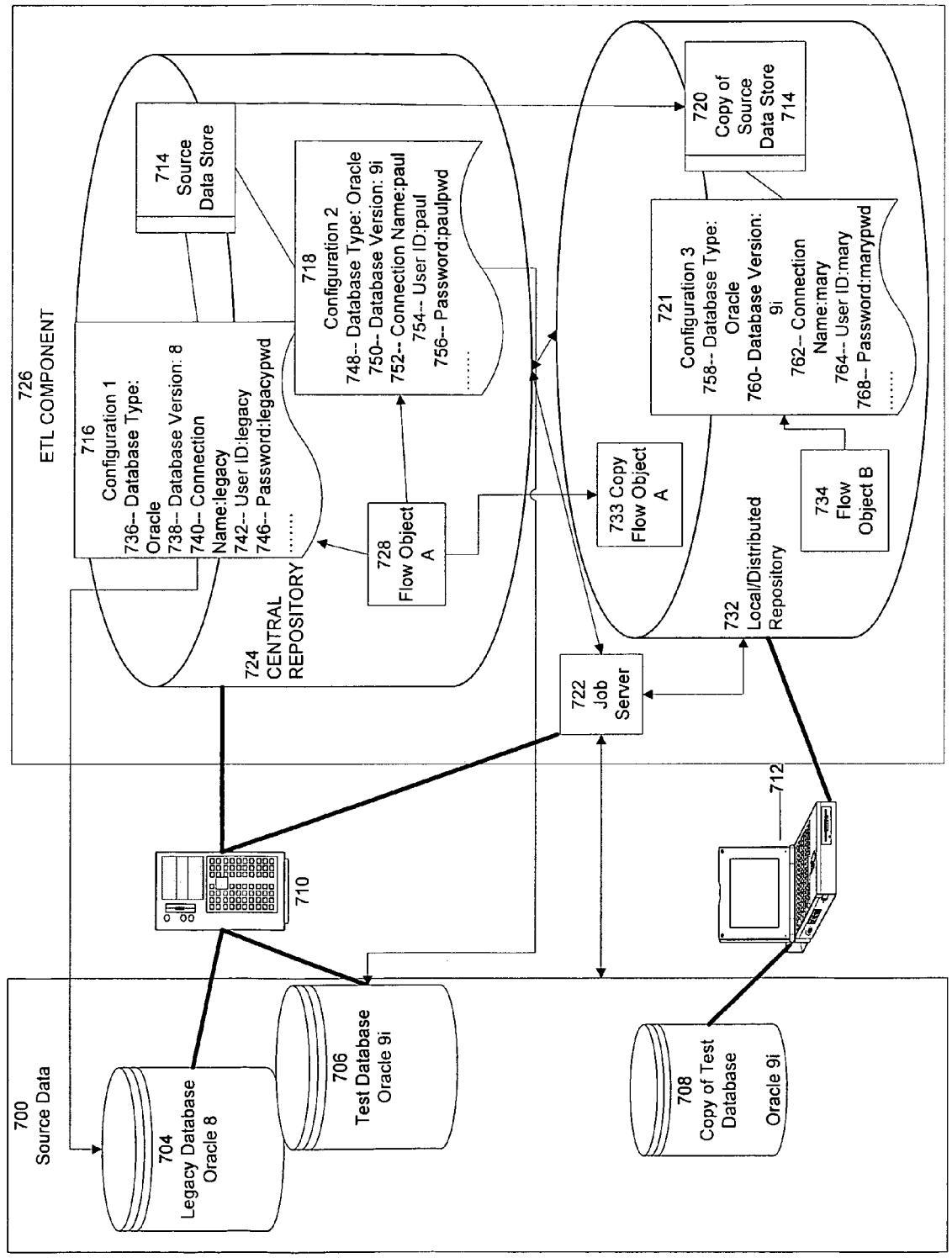
FIG. 7 illustrates a multi-user environment associated with one embodiment of the invention.

FIG. 7 illustrates multiple configuration profiles for a source data store in a simple multi-user environment. In order to provide a simplified illustration of the multi-user environment, FIG. 7 only illustrates a source data store, although there would typically also be a target data store and associated configuration within the repository as well as numerous additional flow objects. In this case there are two repositories, a central repository 724 and a local repository 732. Each repository contains a data store, configuration profiles for the data store, and flow objects. In the central repository is flow object 728 that references two configuration profiles 716 and 718 for data store 714.

A copy of the flow object, data store, and its configurations can be made in the local repository 732. By adding a new configuration 721 to the local copy of the data store 714 the copied flow object 733 is updated to a flow object that has the additional configuration information for the configuration 721. In this way, the original flow object 728 is ported to a local repository 732 and is updated to reference a different data source 708.

In this example, the original repository and databases exist on a server 710 on a network. Then a developer creates a copy of the test Oracle 9i database 708 on a laptop 712. The laptop also contains ETL programming tools including a local repository. In the local repository, the developer might create a copy 733 of the flow object 728 from the central repository 724 that is using a data store profile 718. Then by updating this copy of the flow 733 to use a configuration profile 720 that is specific to the local database, the developer triggers the data store module 116 that makes the additional configurations available to the flow. The user can then modify the copied flow 733 locally creating an updated version 734. In this case, because the data source that is defined by the second configuration profile 720 has the same database type and version as the data source as is defined in the original configuration profile 718, the porting module 126 is not invoked. In one embodiment of the invention, the "copy" is made based on a check-out from a controlled repository system, and the user has the option of checking in the updated version of the objects.

Figure 8:
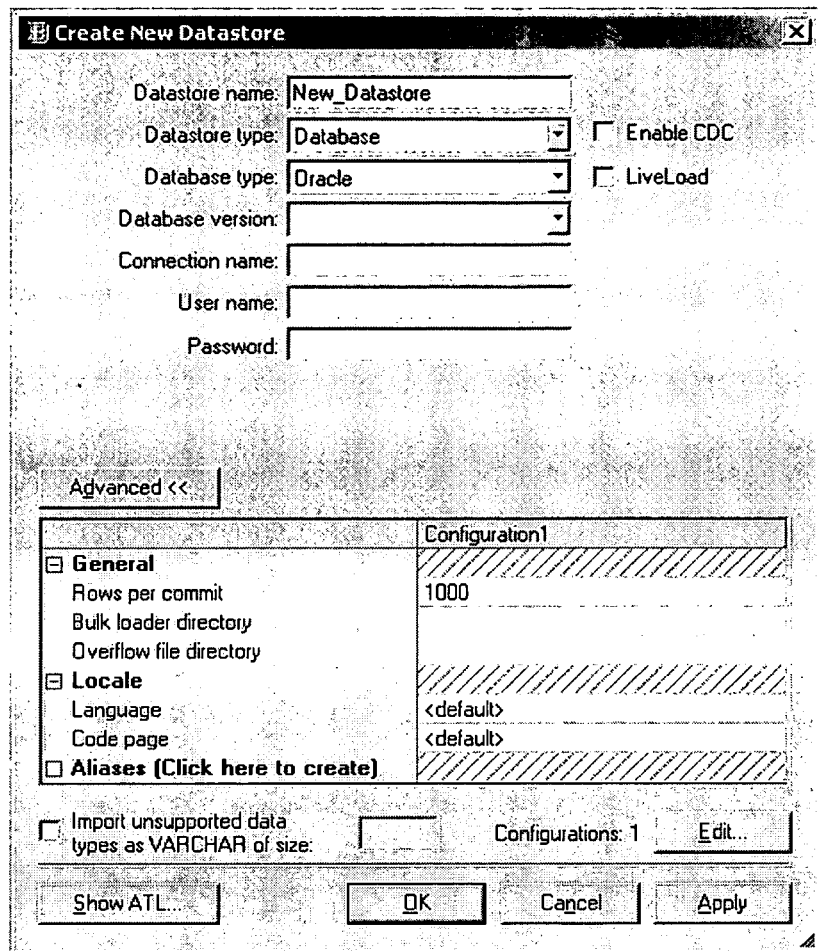
FIG. 8 illustrates a user interface that may be utilized in accordance with an embodiment of the invention.

FIG. 8 illustrates a graphical user interface associated with creating a new data store in one embodiment of the invention. The data store configuration supplied using this interface is associated with the default configuration for the data store that is being defined. A data store is defined for each source and target data source associated with an ETL job. If only a single configuration profile exists for a data store this will be considered the default data store configuration. The user can specify which configuration to use as the default configuration when specifying multiple configuration profiles for a data store. The interface of FIG. 8 includes information to specify a data store name, a data store type, a database version, a connection name, a user name, and a password. Alternate embodiments of the invention use interfaces to solicit different information.

FIG. 9 illustrates a graphical user interface associated with managing multiple configuration profiles in one embodiment of the invention. This user interface enables the editing of configuration profiles and the specification of which data store configuration will be applied. In the example of FIG. 9, three data sources (i.e., Oracle1, MSSQL1, and MSSQL2) are tracked.

Figure 10A:
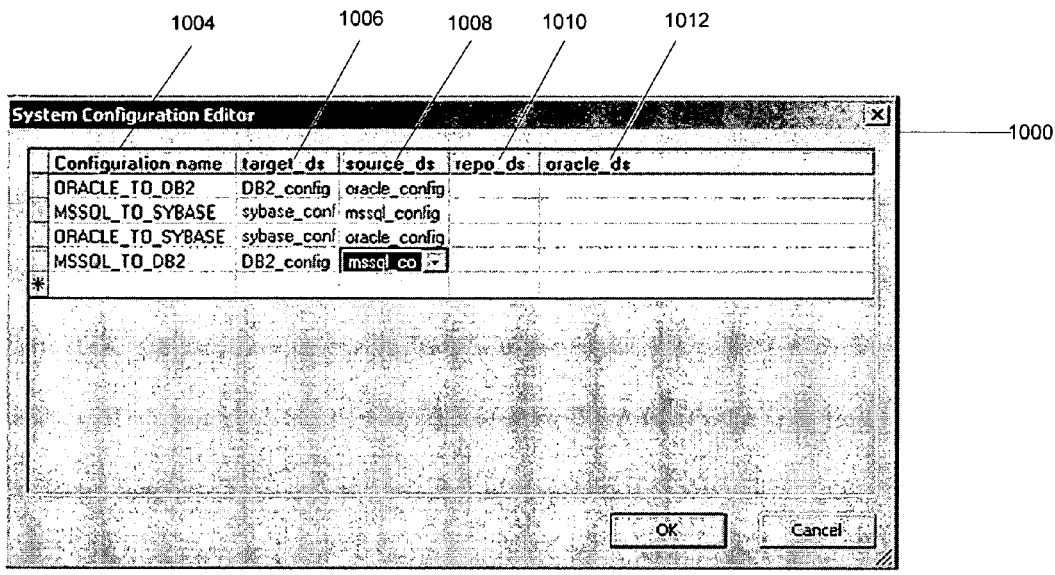
FIGS. 10A and 10B illustrate user interfaces for system configuration that may be utilized in accordance with embodiments of the invention.

FIG. 10A illustrates a graphical user interface associated with setting the data store configuration profile at the system level, in accordance with one embodiment of the invention. Screen 1000 shows the GUI for specifying a system configuration name and specifying the data source profiles that the system configuration is based on. Column 1004 is used to specify the configuration name. Columns 1006, 1008, 1010, 1012 are associated with data stores in the ETL system. For each of these data stores and for each of the configuration names it is possible to identify which data store configuration profile should be used. There may be multiple source and multiple target data stores and a configuration profile for each data store associated with each configuration name.

Figure 10B:
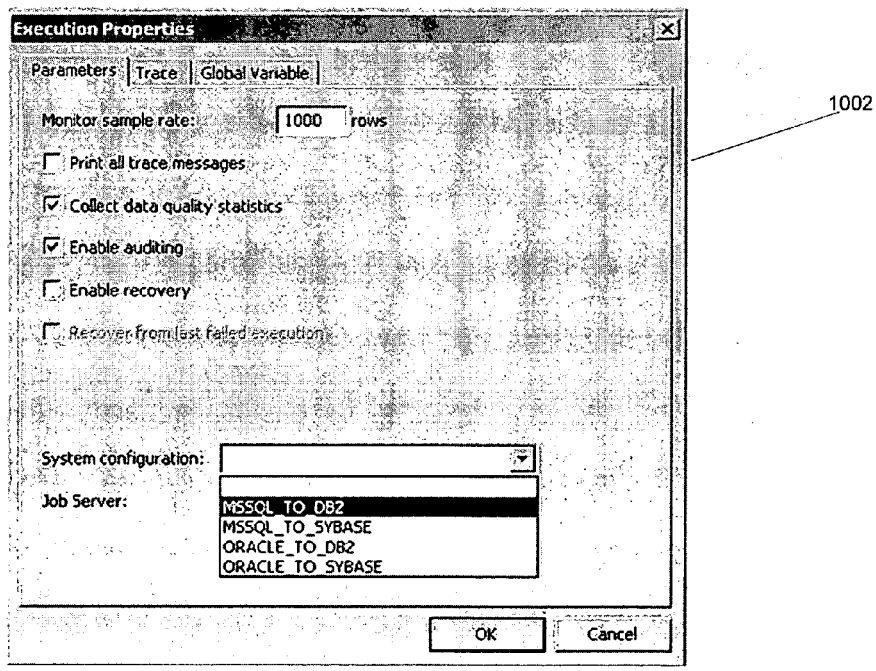

FIG. 10B illustrates a graphical user interface for specifying which of the system configurations the job server will apply when running an ETL job.

Figure 11:
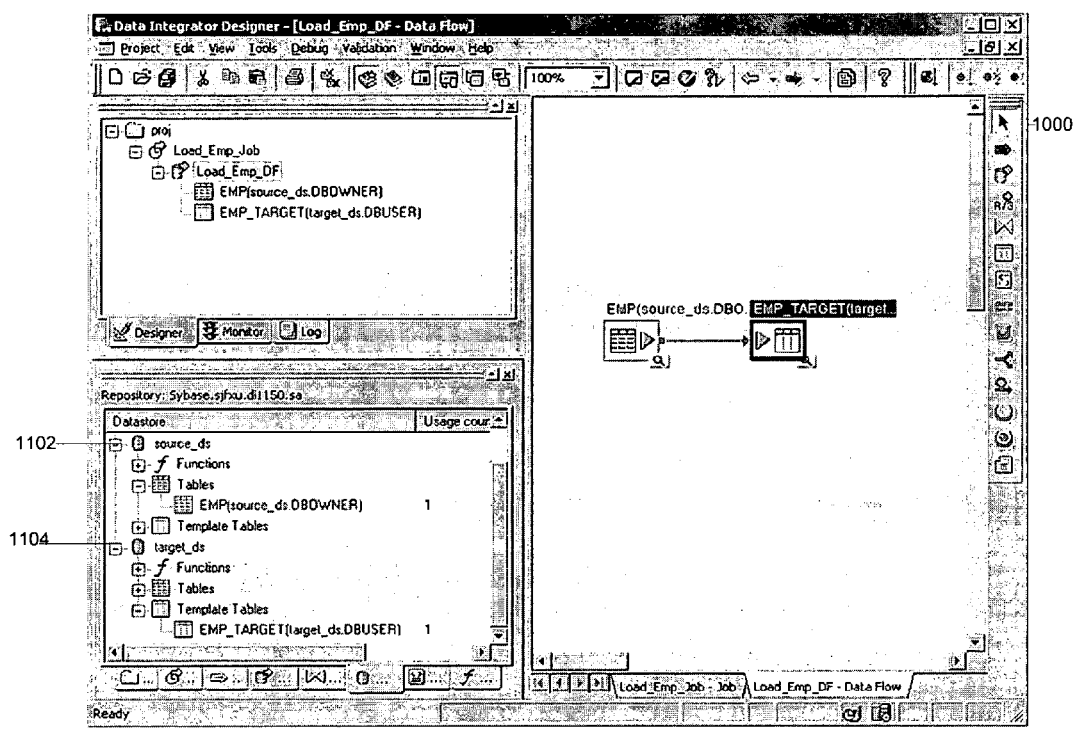
FIG. 11 illustrates a user interface that may be utilized in accordance with an embodiment of the invention.

FIG. 11 illustrates the graphical user interface for composing a job or flow using Data Integrator and specifying the source and target data stores within the job or flow. Depending on the embodiment of the invention, the configuration profiles used for these data stores when the ETL job is run will be selected based on either the system or default configuration for the data store.

Figure 12:
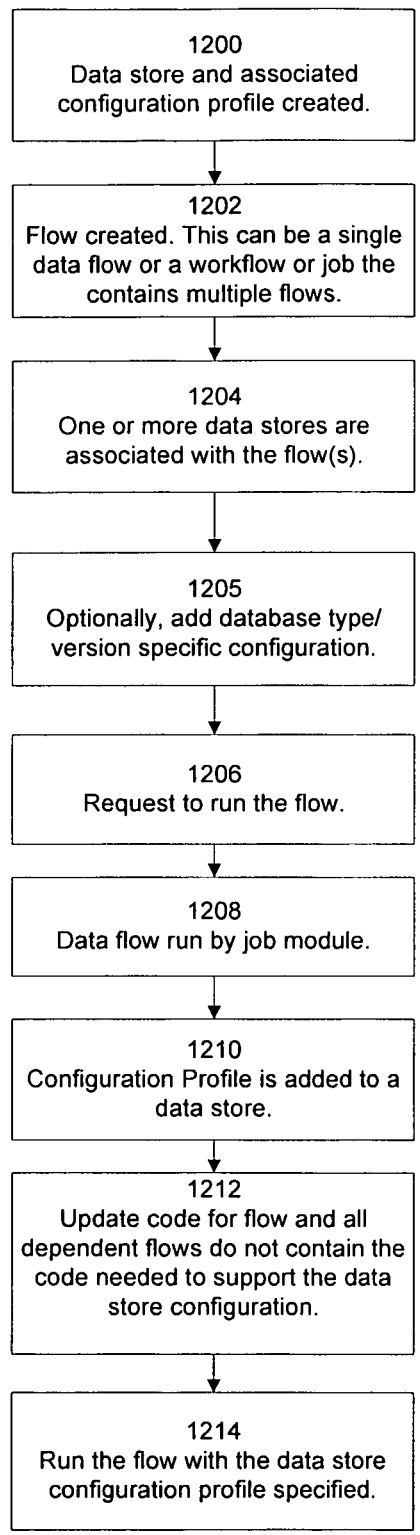
FIG. 12 illustrates processing operations associated with another embodiment of the invention.

FIG. 12 illustrates the interaction between the invention and the general ETL workflow. The data store and associated configuration profile are created 1200. Multiple configuration profiles can be created at any time. In a typical scenario, a first data store profile configuration is created and a second profile is only added later when there is a requirement to update the job to work with a different data source. A flow is created 1202. This can be a single data flow, a workflow, or a job that contains multiple other flows. One or more data stores are associated with the flow(s) 1204. Typically, a data flow has both source and target data stores associated with the data flow. There can be multiple different data sources used as sources or targets of data for the ETL process. Additional configuration can be added to specify reader/loader/SQL transform or other custom properties based on database type and version 1205. This additional configuration is added using the additional configuration module 122 and is applied based on the database type and version specified by a data store configuration profile. A request is received to run the flow 1206. This request can be made either based on a request to run the specific flow or to run a job or workflow that contains the flow. The data flow is run by the job module 1208. The job module determines which data store configuration profile to apply based on either system level configuration or the default configuration profile associated with the data store. A configuration profile is associated with each data store associated with flow and its dependent flows. When an additional configuration profile is added to a data store 1210, the flow and all dependent flows that do not contain the code required to support the additional configuration profile are updated. The process used to update this code is illustrated in FIG. 6 and in FIG. 13.

Figure 13:
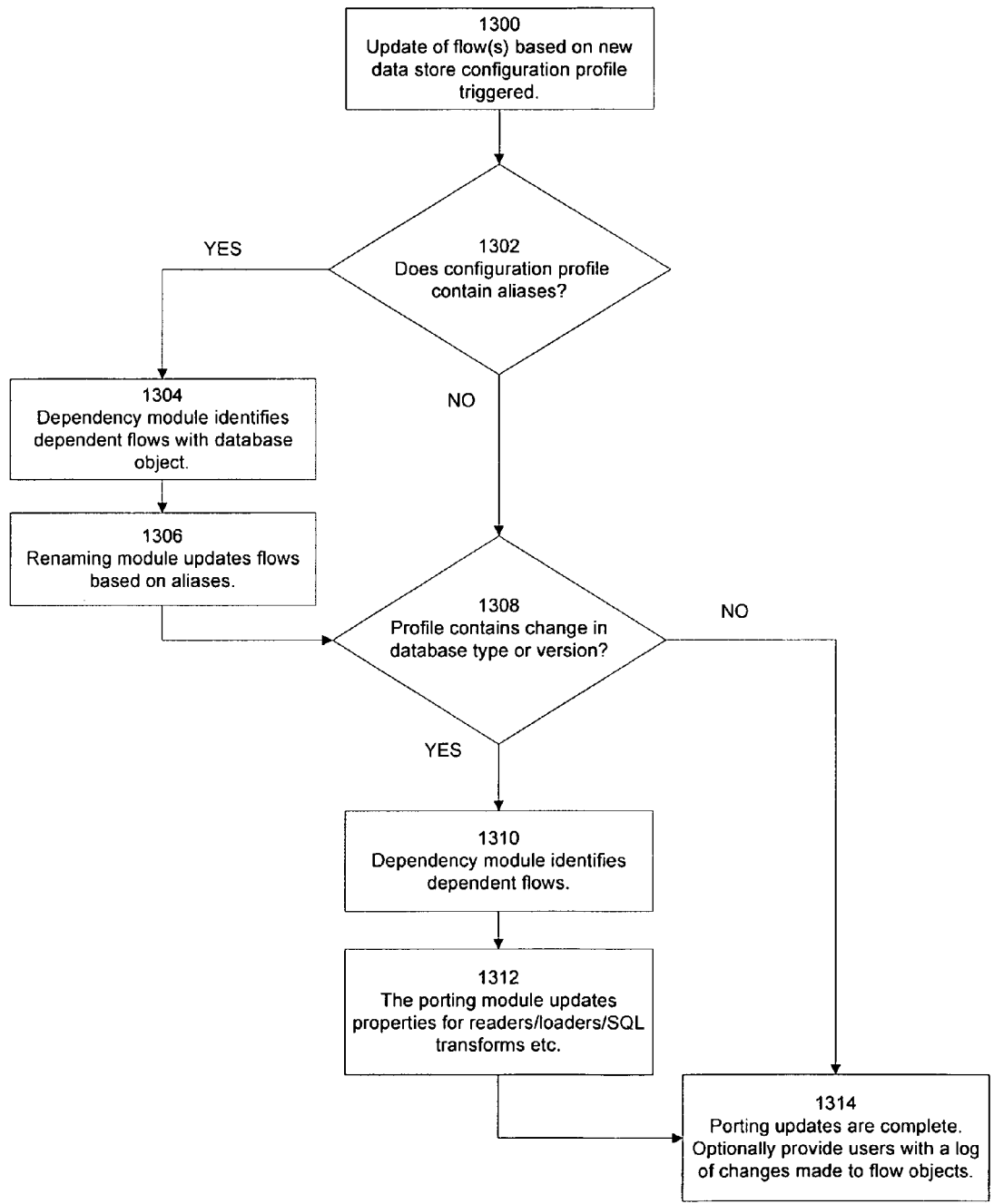
FIG. 13 illustrates processing operations associated with still another embodiment of the invention.

FIG. 13 illustrates the specific mechanisms used to update a flow based on the addition of a data store configuration profile. The process begins when an update to a flow, or a flow and its dependent flows, is triggered based on the addition of a configuration profile 1300. Depending on the embodiment of the invention, the trigger may include adding the additional configuration profile to the data store or associating the additional configuration profile with a specific flow. A check is made to determine whether the configuration profile contains aliases 1302, and if it does a dependency module identifies dependent flows within a database object 1304 and a renaming module updates flows based on the new aliases 1306. A check is made to determine whether the new data store configuration profile contains a change in database type and/or version 1308. If it does not, the porting process is complete 1314. If there is a change in version or type, the dependency module 120 identifies the dependent flows 1310 and the porting module 126 adds the properties for readers/loaders/SQL transforms, etc. in the dependent flow(s) 1312. After these modifications have been made, the porting process is complete and optionally a log is provided 1314. In one embodiment of the invention, renaming based on aliases is a separate process that is not invoked during the porting process.

To effectively support job portability across different data sources, the assumption is that the names for the database tables and stored procedures will be the same for all sources. The schema of the tables should match across the data sources in a data store. This means, the number of columns, the column names and positions should be exactly the same. The column data types should be the same or compatible. For example, if there is a VARCHAR column in the Oracle source, there should also be a VARCHAR column in the Microsoft SQL Server source. If there is a DATE column in the Oracle source, there should be a DATETIME column in the Microsoft SQL Server source. The keys should be defined the same way.

The schema for the stored procedures should also match. When you import a stored procedure from one data store configuration and try to use it for another data store configuration, the invention assumes that the signature of the stored procedure is the same in the two data sources. For example, if a stored procedure is a stored function (only Oracle supports stored functions), then you have to use it as a function with another data source (in other words, that data source has to be Oracle too). If your stored procedure has three parameters in one data source, it should have exactly three parameters in the other data source and the names, positions, data types, and in/out types of the parameters need to correspond.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable medium storing instructions to cause at least one data processor of at least one computing system to port an extract transform load (ETL) job, comprising executable instructions to:
   determine, using a flow object associated with at least one old data store configuration profile, that a new data store configuration profile characterizing a data store is associated with a data flow for the ETL job, the data flow having dependent data flows;
   determine, using the flow object, whether the new data store configuration profile contains aliases to database object owner identities, and if so, identifying dependent flows of the data flow using the aliases and updating the identified dependent data flows to use the aliases;
   determine, using the flow object, if the new data store configuration does not contain aliases, and determine whether the new data store configuration profile contains a change in database type and database version;
   add properties for readers, transforms, and loaders to the dependent data flows of the data flow if it is determined that the new data store configuration profile contains the same database type but higher database version compared to the at least one old data store configuration profile;
   add properties for readers, transforms, and loaders to the dependent data flows of the data flow except for bulk loader properties if it is determined that the new data store configuration profile contains the same database type but lower database version compared to the at least one old data store configuration profile;
   port the ETL job from the data store to a second data store using either the updated dependent data flows or the dependent data flows with the added properties of the data flow; and
   generate a log characterizing porting of the ETL job from the data store to the second data store;
   wherein the log comprises names of the updated data flows, which language is modified, objects in the updated data flows that are affected by the updating, a type of the objects, a usage of the objects, whether the objects have a bulk loader option and whether bulk loader option is copied.

2. A non-transitory computer readable medium as in claim 1, wherein the new data store configuration profile characterizing a data store is determined to be associated with the data flow for the ETL job in response to an update of one of the data flow or the dependent data flows.

3. A method to port an extract transform load (ETL) job, the method being implemented by one or more data processors forming part of at least one computing system and comprising:
   determining, by using the at least one data processor and a flow object associated with at least one old data store configuration profile, that a new data store configuration profile characterizing a data store is associated with a data flow for the ETL job, the data flow having dependent data flows;
   determining, by using the at least one data processor and the flow object, whether the new data store configuration profile contains aliases to database object owner identities, and if so, identifying dependent flows of the data flow using the aliases and updating the identified dependent data flows to use the aliases;
   determine, by using the at least one data processor and the flow object, if the new data store configuration profile does not contain aliases, and determine whether the new data store configuration profile contains a change in database type and database version;
   adding, by the at least one data processor, properties for readers, transforms, and loaders to the dependent data flows of the data flow if it is determined that the new data store configuration profile contains the same database type but higher database version compared to the at least one old data store configuration profile;
   adding, by the at least one data processor, properties for readers, transforms, and loaders to the dependent data flows of the data flow except for bulk loader properties if it is determined that the new data store configuration profile contains the same database type but lower database version compared to the at least one old data store configuration profile; and
   porting, by the at least one data processor, the ETL job from the data store to a second data store using either the updated dependent data flows or the dependent data flows with the added properties; and generating, by the at least one data processor, a log characterizing whether objects in the updated data flows have a bulk force loader and whether the bulk loader option is copied;

wherein the log comprises names of the updated data flows, which language is modified, objects in the updated data flows that are affected by the updating, a type of the objects, a usage of the objects, whether the objects have a bulk loader option and whether bulk loader option is copied.

4. A method as in claim 3 further comprising:
generating, by the at least one data processor, a log characterizing porting of the ETL job from the first data store to the second data store.

5. A method as in claim 3, wherein the new data store configuration profile characterizing a data store is determined to be associated with the data flow for the ETL job in response to an update of one of the data flow or the dependent data flows.

6. A non-transitory computer readable medium, comprising executable instructions to:
receive a job;
correlate a data store with each data source associated with the job;
associate, using a flow object, a first data store configuration profile with the data store;
select a second data configuration profile for the data store, the second data configuration profile characterizes the data store and the second data configuration profile is associated with a data flow for the job;
link the second data configuration profile with the job;
update the flow object to be associated with the flow object;
identify, using the flow object, a dependent data flow associated with the job; and
update the dependent data flow specified by the flow object to include additional configuration information derived from the second data configuration profile by:
determining whether the second data store configuration profile contains aliases to database object owner identities, and if so, identifying dependent data flows of the data flow using the aliases and updating the identified dependent data flows to use the aliases;
determining if the second data store configuration profile does not contain aliases, and determine whether the second data store configuration profile contains a change in database type and database version;
adding properties for readers, transforms, and loaders to the dependent data flows of the data flow if it is determined that the second data store configuration profile contains the same database type but higher database version compared to the first data store configuration profile;
adding properties for readers, transforms, and loaders to the dependent data flows of the data flow except for bulk loader properties if it is determined that the second data store configuration profile contains the same database type but lower database version compared to the first data store configuration profile;
porting the job from the data store to a second data store using either the updated dependent data flows or the dependent data flows with the added properties of the data flow; and
generating a log characterizing porting of the job from the data store to the second data store;
wherein the log comprises names of the updated data flows, which language is modified, objects in the updated data flows that are affected by the updating, a type of the objects, a usage of the objects, whether the objects have a bulk loader option and whether bulk loader option is copied.

7. A method as in claim 4, wherein the log further comprises names of the updated data flows, which language is modified, objects in the updated data flows that are affected by the updating, a type of the objects, and a usage of the objects.

* * * * *